3,332,963
PRODUCTION OF α-SUBSTITUTED γ-LACTONES
Rolf Cramer, Mullheim, Baden, Germany, assignor to
 Dr. Hommel's Chemische Werke und Handelsgesell-
 schaft m.b.H., Mullheim, Baden, Germany
No Drawing. Filed Feb. 28, 1964, Ser. No. 348,262
Claims priority, application Germany, Mar. 4, 1963,
 H 48,430; Jan. 22, 1964, H 51,458
7 Claims. (Cl. 260—343.6)

This invention relates to γ-lactones substituted in the α-position with alkenyl groups or cyclic groups containing the allyl structure —CH=CH—CH<, and more particularly to a process whereby these compounds can be readily and easily produced in good yields.

According to the invention γ-lactones substituted in the α-position with alkenyl groups or cyclic groups containing the allyl structure are obtained by heating together a γ-lactone, an alkali metal t-butylate, and an alkenyl bromide or an allyl-brominated cyclic compound in a non-polar solvent. The substituted γ-lactone can be isolated from the resulting solution in any convenient way.

The invention further comprises the substituted lactones as new substances, and therapeutic compositions containing them in association with a pharmacologically acceptable carrier compatible therewith. Such carriers may be liquid or solid, and such as are conventionally used in the production of, for example, tablets, pills, capsules, syrups, elixirs and the like.

By "allyl-brominated cyclic compound" is meant a cyclic compound containing the structure

—CH=CH—CH<Br

As the γ-lactones γ-butyro- and γ-valero-lactones are particularly important for the present purpose as they are easily obtained, and the substitution products obtained from them are therapeutically advantageous, but the invention includes the production of α-substitution derivatives of other γ-lactones. The alkali metal t-butylate is preferably the potassium compound.

The third reactant is chosen in accordance with the particular substitution product desired. Examples are crotyl bromide ($CH_3CH=CHCH_2Br$) and allyl bromide ($CH_2=CHCH_2Br$) among the alkenyl bromides, and 1-bromo-cyclohexene-2, 9-bromofluorene, and β-methyl-naphthalene bromide-2 among the cyclic compounds. The cyclic compounds are preferably entirely hydrocarbon in nature apart from the bromine atom.

A particularly suitable non-polar solvent is benzene, but others that may be used include its homologues, e.g. toluene and the xylenes, and chlorine-substituted derivatives of benzene and its homologues.

The particular temperature employed is not critical, and may be for example between 50° and 150° C., and especially between 60° and 100° C. Usually it is convenient to work at the boiling point of the non-polar solvent.

In order to reduce or eliminate polymerisation side-reactions, it is advisable to carry out the reaction in the substantial absence of oxygen, e.g. under an atmosphere of an inert gas such as nitrogen or argon. Since nitrogen is quite satisfactory it will generally be used.

Preferably the lactone and unsaturated bromide are employed in approximately equimolecular proportions, i.e. with an excess of either reactant of not more than 20% and preferably not more than 10%. The potassium or other alkali metal t-butylate may be present for example in a molecular proportion between 100 and 200%, preferably 120 to 150%, reckoned on the lactone.

The substituted lactone produced may be isolated from the solution in which it is formed by adding to the cooled solution an aqueous acid, preferably a moderately dilute aqueous hydrochloric acid, e.g. of concentration 10–15%, separating the aqueous phase, and distilling or evaporating the solvent from the organic phase. The separated aqueous phase is preferably extracted thoroughly with a water-immiscible organic solvent for the substituted lactone, especially petroleum ether, and the extract or extracts added to the organic phase. The residue from the evaporation of the solvent may be further purified by steam distillation, followed by extraction of the distillate with petroleum ether or other suitable water-immiscible solvent, drying of the extract, e.g. over sodium sulphate, and careful removal of the solvent by distillation or evaporation.

The substituted lactones are new compounds, which have been found to possess a very strong pharmacological action coupled with a very low toxicity. Special mention should be made of their antihistamine action, their anti-anaphylactic action, their effect on the blood circulation, their anticonvulsive action and a strong ataractic action.

For such uses they may be employed in admixture with the usual pharmaceutically acceptable diluents, solvents, or other additives, in accordance with the means of administration to be adopted.

The following examples illustrate the invention.

EXAMPLE 1

Manufacture of α-allyl-γ-valerolactone

A mixture of 40.0 g. of γ-valerolactone and 44.0 g. of allylbromide is added with stirring to a mixture of 58 g. of potassium t-butylate (alcohol free) in 400 ml. of dry benzene. A current of nitrogen is passed over the mixture while it is stirred for 6 hours at the boil (80° C.).

After cooling, 200 ml. of water and then 200 ml. of 25% hydrochloric acid are added and the whole is vigorously stirred for 15 minutes. The reaction product is allowed to separate in a separating funnel; the lower, aqueous, hydrochloric acid, phase is exhaustively extracted with petroleum ether and the collected organic fractions are mixed with the benzene phase. The solvents are distilled off and the residue is purified by steam distillation. The distillate is extracted with petroleum ether, the organic phases are dried over sodium sulphate, and the petroleum ether is cautiously disstilled off. Yield: 51 g corresponding to 89.7% of the theoretical.

$$D_4^{20}=0.995;\ n_D^{20}=1.4502$$

Analysis.—$C_8H_{12}O_2$; mol. wt. 140.17. Calculated: C 68.55%; H, 8.63%; O, 22.82%. Found: C, 68.52%, H 8.60%; O, 22.89%.

EXAMPLE 2

Manufacture of α-allyl-γ-butyrolactone

A mixture of 34.4 g. of γ-butyrolactone and 44.0 g. of allylbromide is added with stirring to a mixture of 58 g of potassium t-butylate (alcohol free) in 400 ml. of dry benzene. A current of nitrogen is passed over the reaction mixture while it is stirred for 6 hours at the boil. After cooling, 200 ml. of water and then 200 ml. of 25% hydrochloric acid are added and the batch is vigorously stirred for 15 minutes.

The product is worked up as described in Example 1 Yield: 43.2 g. corresponding to 85.7% of the theoretical $$D_4^{20}=1.043;\ n_D^{20}=1.4551$$

Analysis.—$C_7H_{10}O_2$; mol. wt. 126.15. Calculated: C 66.65%; H, 7.99%; O, 25.36%. Found: C, 66.64%; H 8.01%; O, 25.39%.

EXAMPLE 3

Manufacture of α-crotyl-γ-valerolactone

A mixture of 30.0 g. of γ-valerolactone and 46.3 g. c crotylbromide is added with stirring to a mixture of 45 g of potassium t-butylate (alcohol free) in 300 ml. of dry benzene. A current of nitrogen is passed over the reaction mixture while it is stirred for 6 hours at the boil.

After cooling, 150 ml. of water and then 150 ml. of 25% hydrochloric acid are added and the whole is vigorously stirred for 15 minutes.

The product is worked up as described in Example 1. Yield: 39.5 g. corresponding to 85.5% of the theoretical.

$D_4^{20} = 1.003$; $n_D^{20} = 1.4481$

Analysis.—$C_9H_{14}O_2$; mol. wt. 154.21. Calculated: C, 70.09%; H, 9.15%; O, 20.76%. Found: C, 70.14%; H, 9.13%; O, 20.81%.

EXAMPLE 4

Manufacture of α-cyclohexenyl-(2)-γ-valerolactone

A mixture of 100.0 g. of γ-valerolactone and 161.0 g. of 1-bromo-cyclohexene-(2) is dissolved in a small amount of benzene and added with stirring to a mixture of 145.0 g. of potassium t-butylate (alcohol free) in 1000 ml. of dry benzene. A current of nitrogen is passed over the reaction mixture while it is stirred for 6 hours at the boil. After cooling, 500 ml. of water and then 500 ml. of 25% hydrochloric acid are added, and the whole is vigorously stirred for 15 minutes. The reaction mixture is then allowed to separate in a separating funnel; the lower, aqueous, hydrochloric acid, phase is exhaustively extracted with petroleum ether, and the collected organic fractions are combined with the benzene phase. The solvents are distilled off and the residue is purified by steam distillation. The distillate is repeatedly extracted with petroleum ether, the combined organic phases are dried over sodium sulphate, and the petroleum ether is cautiously distilled off. Yield: 160 g. corresponding to 88.8% of the theoretical.

Analysis.—$C_{11}H_{16}O_2$; mol. wt. 180.24. Calculated: C, 73.30%; H, 8.95%; O, 17.75%. Found: C, 73.26%; H, 8.99%; O, 17.70%.

EXAMPLE 5

Manufacture of α-fluoroenyl-γ-valerolactone

A mixture of 100.0 g. of γ-valerolactone and 245.0 g. of 9-bromofluorene is dissolved in a small amount of benzene and added with stirring to a mixture of 145.0 g. of potassium t-butylate (alcohol free) in 1000 ml. of dry benzene. A current of nitrogen is passed over the reaction mixture while stirring it for 6 hours at 80° C. After cooling, 500 ml. of water and then 500 ml. of 25% hydrochloric acid are added and the whole is vigorously stirred for 15 minutes. The reaction mixture is then allowed to separate in a separating funnel, the lower, aqueous hydrochloric acid, phase is exhaustively extracted with petroleum ether, and the collected organic extracts are combined with the benzene phase of the reaction product. For further working up the organic solution is evaporated and allowed to crystallise. Yield: 210 g. corresponding to 79.5% of the theoretical.

Analysis.—$C_{18}H_{16}O_2$; mol. wt. 264.31. Calculated: C, 81.79%; H, 6.10%; O, 12.11%. Found: C, 81.86%; H, 6.19%; O, 11.94%.

EXAMPLE 6

Manufacture of α-(β-methylnaphthyl)-γ-valerolactone

A mixture of 100.0 g. of γ-valerolactone and 221.0 g. of bromomethylnaphthalene-(2) is dissolved in a small amount of benzene and added with stirring to a mixture of 145.0 g. of potassium t-butylate (alcohol free) in 1000 ml. of dry benzene. A current of nitrogen is passed over the reaction mixture while it is stirred for 6 hours at 80° C. After cooling, 500 ml. of water and then 500 ml. of 25% hydrochloric acid are added and the whole is vigorously stirred for 15 minutes. The batch is worked up as described in Example 4. Yield: 188 g. corresponding to 78.3% of the theoretical.

Analysis.—$C_{16}H_{16}O_2$; mol. wt. 240.29. Calculated: C, 79.97%; H, 6.71%; O, 13.32%. Found: C, 79.92%; H, 6.76%; O, 13.29%.

I claim:

1. Process for the production of an α-substituted γ-lactone in which the substituent groups are unsaturated groups selected from the class which consists of alkenyl groups and cyclic groups containing the allyl structure, which comprises heating together in the substantial absence of oxygen a non-polar organic solvent as reaction medium an γ-lactone containing 4–5 carbon atoms all in the ring, an alkali metal t-butylate, and an unsaturated compound selected from the class which consists of lower alkenyl bromides and allyl-brominated cyclic compounds having in the ring the structure

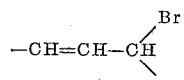

and containing apart from the bromine atom, only carbon and hydrogen, and isolating the substituted lactone from the solution so obtained.

2. Process according to claim 1 wherein the alkali metal t-butylate is potassium butylate.

3. Process according to claim 1, wherein the lactone and unsaturated compound are employed in molecular proportions between 1.2:1 and 1:1.2.

4. Process according to claim 1, wherein the lactone and potassium t-butylate are employed in molecular proportions between 1:1 and 1:2.

5. Process according to claim 1, wherein the substituted γ-lactone is isolated from the solution by adding aqueous hydrochloric acid to the cooled solution, allowing the solution to separate into two phases, and isolating the substituted γ-lactone from the organic phase.

6. Process according to claim 5, wherein the aqueous phase is extracted with petroleum ether, and the resulting extract added to the organic phase.

7. Process according to claim 5, wherein the substituted γ-lactone is recovered from the organic phase by distilling off the solvent.

References Cited

Wagner et al.: Synthetic Organic Chemistry, (1953), page 340.

Wessel et al.: Chemical Abstracts, vol. 32, col. 3337, (1938).

Wilimowski et al.: Chemical Abstracts, vol. 54, col. 3755h, (1960).

ALEX MAZEL, Primary Examiner.

J. A. NARCAVAGE, Assistant Examiner.